(12) United States Patent
Greelish

(10) Patent No.: US 7,417,923 B2
(45) Date of Patent: Aug. 26, 2008

(54) METHOD AND APPARATUS FOR PERFORMING AN ULTRASONIC SURVEY

(76) Inventor: Stephen John Greelish, 130 Pond Cir., Mashpee, MA (US) 02649

( * ) Notice: Subject to any disclaimer, the term of this patent is extended or adjusted under 35 U.S.C. 154(b) by 0 days.

(21) Appl. No.: 10/935,986

(22) Filed: Sep. 8, 2004

(65) Prior Publication Data
US 2005/0099892 A1 May 12, 2005

Related U.S. Application Data

(60) Provisional application No. 60/517,948, filed on Nov. 6, 2003.

(51) Int. Cl.
*G01S 3/80* (2006.01)
(52) U.S. Cl. ........................ 367/129; 367/131
(58) Field of Classification Search ............... 367/124, 367/129, 131, 904
See application file for complete search history.

(56) References Cited

U.S. PATENT DOCUMENTS

| | | | | |
|---|---|---|---|---|
| 4,037,189 A | * | 7/1977 | Bell et al. | 367/129 |
| 5,047,990 A | * | 9/1991 | Gafos et al. | 367/6 |
| 6,317,387 B1 | * | 11/2001 | D'Amaddio et al. | 367/129 |
| 6,571,635 B1 | * | 6/2003 | Baltzersen et al. | 73/625 |

* cited by examiner

Primary Examiner—Ian J. Lobo
(74) Attorney, Agent, or Firm—Robert K. Tendler

(57) ABSTRACT

An ultrasonic surveying method includes a network of transceivers adjacent the item to be surveyed to establish a reference plane and locating an array of pingers on the object to be surveyed to establish a survey plane, establishing by ranging from the pingers to the network the location of the survey plane, detecting relative motion between the network and the pingers and correcting survey measurements for the detected motion.

19 Claims, 12 Drawing Sheets

METHOD AND APPARATUS FOR PERFORMING AN ULTRASONIC SURVEY

RELATED APPLICATIONS

This Application claims rights under 35 USC 119(e) from U.S. Provisional Application Ser. No. 60/517,948 filed Nov. 6, 2003, the contents of which are included herein by reference.

FIELD OF THE INVENTION

This invention relates to ultrasonic surveying and more particularly to a method for compensating for relative motion between an ultrasonic target and an ultrasonic detector.

BACKGROUND OF THE INVENTION

In the past, ship hull inspections have been required in order to obtain certification from governmental authorities as to the seaworthiness of the vessel.

The most common way to obtain the governmental certificate is to dry-dock the vessel, an expensive process, and to both visually and ultrasonically inspect the hull of the vessel when it is in dry dock. The procedure takes the vessel out of service for as much as two weeks and requires as many as five to ten technicians in order to survey the hull.

Typically in such a case, a surveying instrument is run over the surface of the hull, with the position of the surveying instrument being mechanically measured from a fiducial point on the hull. The accuracy of the measured point on the hull is a function of how accurate the manual surveying is, which is a time-consuming process. One generally has to measure the distance of the head of the surveying instrument to the fiducial point utilizing mechanical gauges, measuring rods or bars and the like, with position measurements being subject to error.

As a result of the difficulty of accurately specifying the location of the surveying instrument, surveyors typically measure out a one-foot grid across the surface of the hull and take measurements at the cross-points. The problem, however, is that with one-foot spacing, wasting and other defects in the hull are oftentimes missed if they occur between the cross-points.

In an effort to avoid dry-docking the vessel, divers are sometimes sent down to survey the hull by swimming about the hull and measuring hull thickness and wasting at various points. The location of the diver making the survey and thus the points surveyed is likewise problematic, with physical measurements of a surveyed point underwater being much more difficult than when the ship is hauled out. To help in specifying the measurement points, in the past sonar techniques were used to locate the diver. However, positional inaccuracies are in the one-meter range.

Thus, whether there is an in-water survey through the utilization of divers or whether the vessel is hauled out for the survey, in the past, surveys have suffered from the fact that the number of actual measurements made on the hull is limited, meaning that there are areas of the hull which remain unsurveyed. Wasting, sometimes underneath support structures within the hull and at places where they are not visible, contribute to the unseaworthiness of the vessel. Historically, vessels within weeks of having been surveyed have broken up at sea due to the fact that wasting and other defects were not uncovered by the survey.

In order to obtain better in-water measurements, ships have been tied up to piers or are placed at anchor. However, it is impossible to render the ship motionless against winds, tides and current, even if anchored bow and stern. There is always a certain amount of motion of the vessel due to currents and wave action so that depending on the size of the vessel, the hull may move by many meters, which directly impacts trying to ascertain where the survey measurements were made.

In general, the measurements are made at inspection points on the hull which are either visual or sonic inspections of hull plating, hull thickness, weld integrity, cathodic erosion and other hull weaknesses for which one seeks to have a map of the defects so that one can repair the hull at the point where the defect is detected.

Were it possible to accurately determine the position of the hull vis-à-vis the sensor used to detect the hull defect and were it possible to make measurements in a virtually continuous fashion, then the hull could be completely and accurately inspected. This in turn requires a system that is motion-compensated.

SUMMARY OF INVENTION

In order to be able to survey a ship's hull by doing an in-water survey so that the vessel need not be hauled, a fixed network of transceivers is deployed on the seabed underneath the vessel to establish a reference plane. A number of pingers are attached to the hull to define a hull plane. Acoustic ranging from the pingers to the seabed transceivers establishes the location of the hull plane relative to the seabed reference plane. Changes of the hull plane position with respect to the reference plane are tracked in real time and the origin of the hull plane is shifted in accordance with sensed positional changes of the hull plane.

Thereafter survey measurements are referenced to the shifted coordinates of the hull plane. The result is that one can make hull survey measurements every centimeter as opposed to every foot and can do so in a virtually continuous manner so that no defect will remain undetected. Moreover, the time to perform the survey is cut tenfold and the number of personnel involved is cut by a factor of five. The reason for the success of the subject system is real-time compensation for hull movement.

In the subject system, motion compensation transfers the origin of the fixed reference plane to the origin of the hull plane through a transformation process using a geographic frame. In one embodiment the transformation of point coordinates from one coordinate system to the other requires two operations: translation and rotation.

The subject system measures shifts between the two planes, transfers the initial hull plane origin to a new position corresponding to ship motion and locates the survey measurement relative to the shifted coordinates of the hull plane.

To do so, in the subject invention a fixed array of transceivers is located on the ocean bed to define the fixed reference plane, with the transceivers having transducers to be able to detect pulses from pingers on the hull that are positioned with respect to a fiducial point on the hull to define a plane. Since the transceivers on the floor of the ocean do not move, it is possible through ranging techniques to establish the distance of each of the pingers to various transceivers in the array on the floor of the ocean. One can then ascertain a shift in the position of the plane represented by the pingers on the hull with respect to the reference plane and then correct any measurements, for instance, made by a robot flying around the hull. In this manner the position of the point on the hull surveyed relative to the seabed transceivers can be automatically updated.

It can be shown that with motion compensation, wasting and other measurements of the hull made from an accurately locatable robot flying around the hull can result in a virtually continuous mapping of hull defects. This is because accurate measurements can be done on one-centimeter centers. As a result, all hull defects will be detected with no gaps.

Note the subject system uses the geographic frame as the basis of the coordinate system, with the X, Y plane parallel to the earth's surface. The X, Y and Z planes are orthogonal, with Z pointing perpendicular to the earth's surface. In one embodiment, one translates a fiducial point on the seabed to a fiducial point on the hull through a transformation matrix, with the transformation being simplified in that the Z direction never changes.

Because the Z-axis does not change, the errors introduced by the transformation process are minimized because of the limiting of the number of computations involved. Thus errors do not creep in to degrade the centimeter accuracy of the system.

Moreover, rather than using the reference plane established by the array of seabed transceivers, in one embodiment a "virtual" horizontal reference plane parallel to the earth's surface, i.e., or the sea surface, is established from the reference plane established by the seabed transceivers. Use of this virtual reference plane as opposed to the one established by laying down transceivers also greatly simplifies the transformation matrix. This is because the position of the Z-axis is always straight up and down, with the surface of the ocean being at right angles to this Z-axis. Shifts of points on the hull are thus easily described in terms of rotation of the X, Y-axes about the Z-axis.

To do the survey, one first deploys an array of at least three transceivers on the ocean bed, two of which establish an X direction baseline in terms of a line from one transceiver that constitutes the 0, 0, 0 origin of the reference plane to the other transceivers.

One provides each of the transceivers not only with a transducer for detecting sonic energy from the aforementioned pingers, but also a clock that is started or reset by a master clock pulse that is also used to trigger the pingers to produce acoustic pulses. When an acoustic pulse of predetermined frequency (indicating which pinger originated the pulse) arrives, the elapsed time between the master clock pulse and the received acoustic pulse is recorded. The result is the acoustic range of the pinger to the transceiver. A master clock synchronizing system coupled to the pingers and the transceivers make acoustic ranging possible since a transceiver will know the instant the associated pinger produces its pulse and can measure the time it takes for the pulse to reach the transceiver. This is then converted to range.

Because the seabed is not parallel to the surface of the ocean, each of the transceivers is provided with a depth sensor that is sufficiently accurate to provide the position along the Z-axis of each of the transceivers. A translation algorithm provides "virtual" transceiver points to create a "virtual" reference plane parallel to the sea surface at a depth corresponding to the depth of the 0, 0, 0 transceiver. Using this virtual reference plane facilitates the measuring and makes motion compensation simpler.

The motion compensation algorithm is further simplified by arranging the three transceivers that define the reference plane on the ocean floor to constitute a right triangle. Since in the physical world this is difficult to establish, a transformation algorithm changes the coordinates of the transceiver defining the Y-axis so that this transceiver is given a virtual position that establishes the right triangle.

By providing a virtual plane parallel to the sea surface (and therefore perpendicular to the Z-axis) composed of a right triangle, one can simply measure the positions of the pingers on the hull vessel relative to the Z-axis as X, Y-axis rotations about the Z-axis.

Note that horizontal translation of the hull is resolvable in the X, Y plane and that roll of the hull causes the Z position of the pingers to change.

On the surface of the hull, when three pingers are used to specify a plane on the hull, one can define an X-axis baseline from a first pinger to a second pinger. If the hull is curved, this baseline will extend through the hull. One can then define the position of the hull from an origin corresponding to one of the transceivers on the hull and describe the plane on the hull in terms of rotation about the Z-axis, which is constant. To correct for any lack of vertical orientation of the hull plane one can form a "virtual" vertical hull plane in much the same way as the "virtual" horizontal reference plane is created for the seabed transceiver array.

Referencing all of the relative motions to the Z-axis and deriving a virtual horizontal reference plane and a virtual vertical hull plane greatly simplifies the mathematics for the transformation matrix used in motion compensation.

It is the recognition that in these measurements, the Z-axis is always in a constant direction, takes the measuring problem out of the realm where one must specify all relative axes. Such is the case of docking to space stations, and eliminates the errors of having to specify the position of the Z-axis. The result is that computational complexity is reduced as well as the errors due to the number of computations that would have to be made if the Z-axis were not constant.

Moreover, since depth is always measured along the Z-axis, recognizing that the Z-axis direction is invariant results in a simple system for generating the aforementioned virtual horizontal reference plane and the virtual vertical hull plane.

Having established a horizontal reference plane by virtue of the array of transceivers on the seabed, and having established an origin to those transceivers, one can transfer this origin coordinate to one of the pingers on the hull. The position of the hull is thereafter continuously monitored by periodically activating the pingers such that, once one defines the origin point on the hull, one can back-calculate the plane position.

Thus, the subject motion compensation system includes providing a perfectly aligned plane to the earth's surface by virtue of the using transceivers with depth determining apparatus, by measuring the range to the pingers on the hull from the perfectly-aligned reference plane, which is fixed, by determining a shift from an initial position of the hull relative to this reference plane, and by then measuring the position of the sonic measurement relative to a sensed shifted position of the hull.

In so doing, one can provide a CAD drawing of the hull, with measurement data superimposed thereon at the precise location on the hull where the data is collected, with all measurements referenced to the corrected hull plane position to simplify the measuring process.

The result is that one can do an in-water survey of the hull through locating transceivers on the seabed beneath the hull, locating pingers on the hull at predetermined points on the hull, establishing synchronous timing between the pinger-produced pulses and the clocks at the transceivers, by calculating a transform for measured range shifts from an initial position of the hull through transferring the fixed origin on the seabed to one of the pingers on the hull and by translating this origin by an amount required to account for the sensed change in position of the hull due to hull motion. Once having achieved knowledge of the shifted origin on the hull, measurements made relative to that origin can be spatially correlated with positions on the plane so that the measurement location can be accurately ascertained.

This can be accomplished in a continuous process so that the mean distance on the hull between measuring sites is on the order of one centimeter, as opposed to one foot. The result of this type of surveying is that the entire hull is surveyed centimeter by centimeter as opposed to foot by foot, whereby defects that were hitherto undetected are now detectable.

Moreover, the time necessary for completing such a survey is not on the order of weeks but on the order of hours, with the number of personnel reduced from five-to-ten divers to the use of one diver and a maneuverable robot, thus cutting the cost of the hull survey by a factor of five and cutting the time necessary for keeping the vessel out of service for the survey by tenfold.

While the subject invention will be described in terms of surveying a hull that moves relative to a fixed transceiver array, it will be appreciated that when seeking to ascertain defects, for instance, in a fixed structure such as a dam, one may have relative movement between the array of transceivers and the fixed dam structure on which pingers are located. The subject system can therefore be utilized to cancel out the effect of the motion of the sensor array vis-à-vis the fixed dam by establishing a plane defined by the array of non-fixed transceivers and measuring the movement of this plane relative to a plane established by fixed points on the surface of the dam.

In summary, an ultrasonic surveying method includes a network of transceivers adjacent the item to be surveyed to establish a reference plane and locating an array of pingers on the object to be surveyed to establish a survey plane, establishing by ranging from the pingers to the network the location of the survey plane, detecting relative motion between the network and the pingers and correcting survey measurements for the detected motion.

BRIEF DESCRIPTION OF THE DRAWINGS

These and other features of the subject invention will be better understood in connection with a Detailed Description, in conjunction with the Drawings, of which.

DETAILED DESCRIPTION

Figure 1:
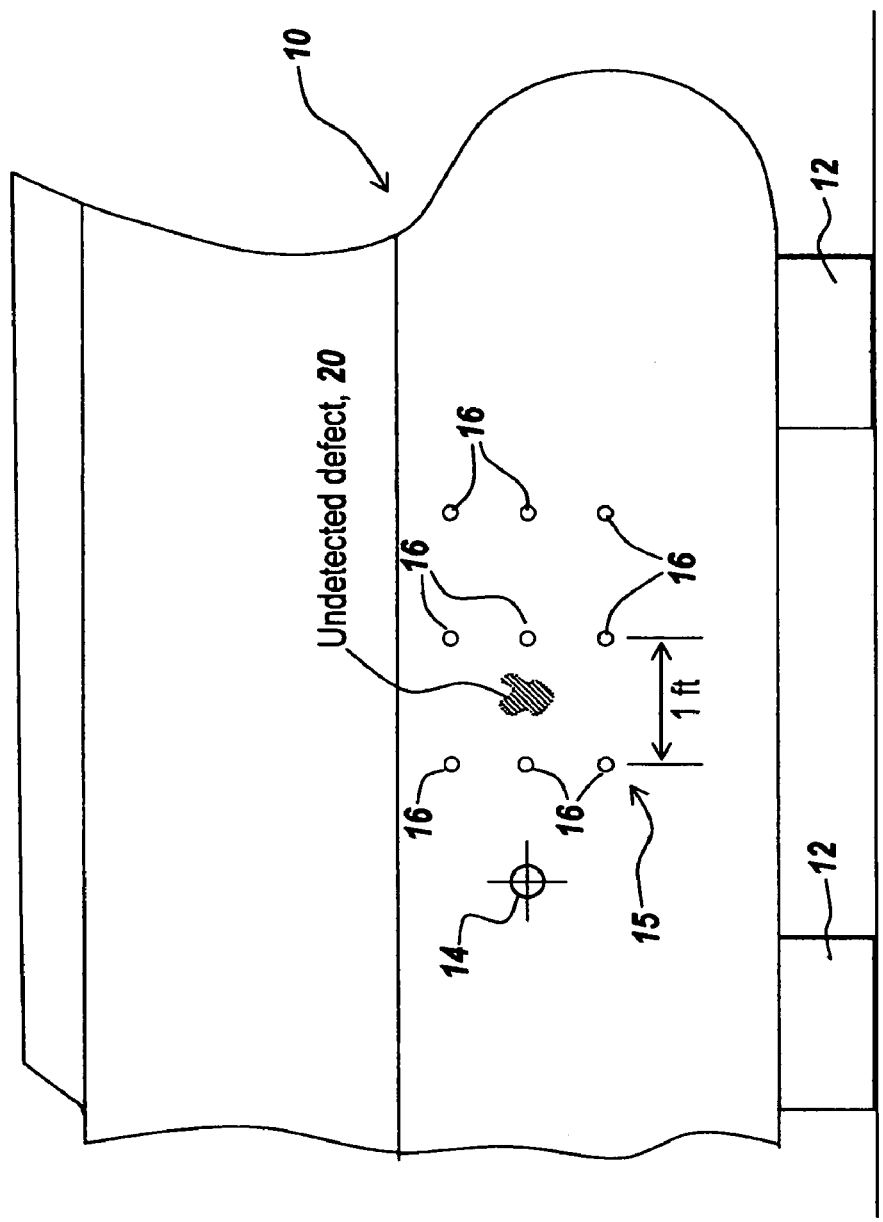
FIG. 1 is a diagrammatic illustration of the survey of a vessel in dry-dock, indicating an undetected defect due to the relatively wide spacing of the sample locations across the hull.

Referring now to FIG. 1, in the prior art, when a hull 10 is to be surveyed, it is hauled out at a dry-dock as symbolically illustrated by blocks 12. In order to perform the survey, a grid is mapped out on hull 10 relative to a fiducial point 14. The cross-points 16 on the grid are the points at which measurements are to be recorded.

Due to the difficulty of accurately locating measuring points relative to the fiducial point, a grid 15 is established across the hull mechanically by measuring rods or an overlay.

However, due to the difficulty of providing a large number of measuring points on the hull, it is common to limit the number of measuring points by separating the measuring points 16 by one foot. It is assumed for surveying purposes that surveying the hull at these one-foot-spaced points is sufficient to be able to detect a defect 20, which defect could be a hull weakening, a hull wasting, deteriorating weld lines, or any other defect which would cause one to repair that portion of the hull.

However, as can be seen in FIG. 1, defect 20 can lie between adjacent measuring points 16 and therefore is undetected.

This could occur because the wasting could be on a structural member that lies between the measuring points or could be obscured from the measuring device due to the fact that at the measuring point a portion of the defect is obscured.

Figure 2:
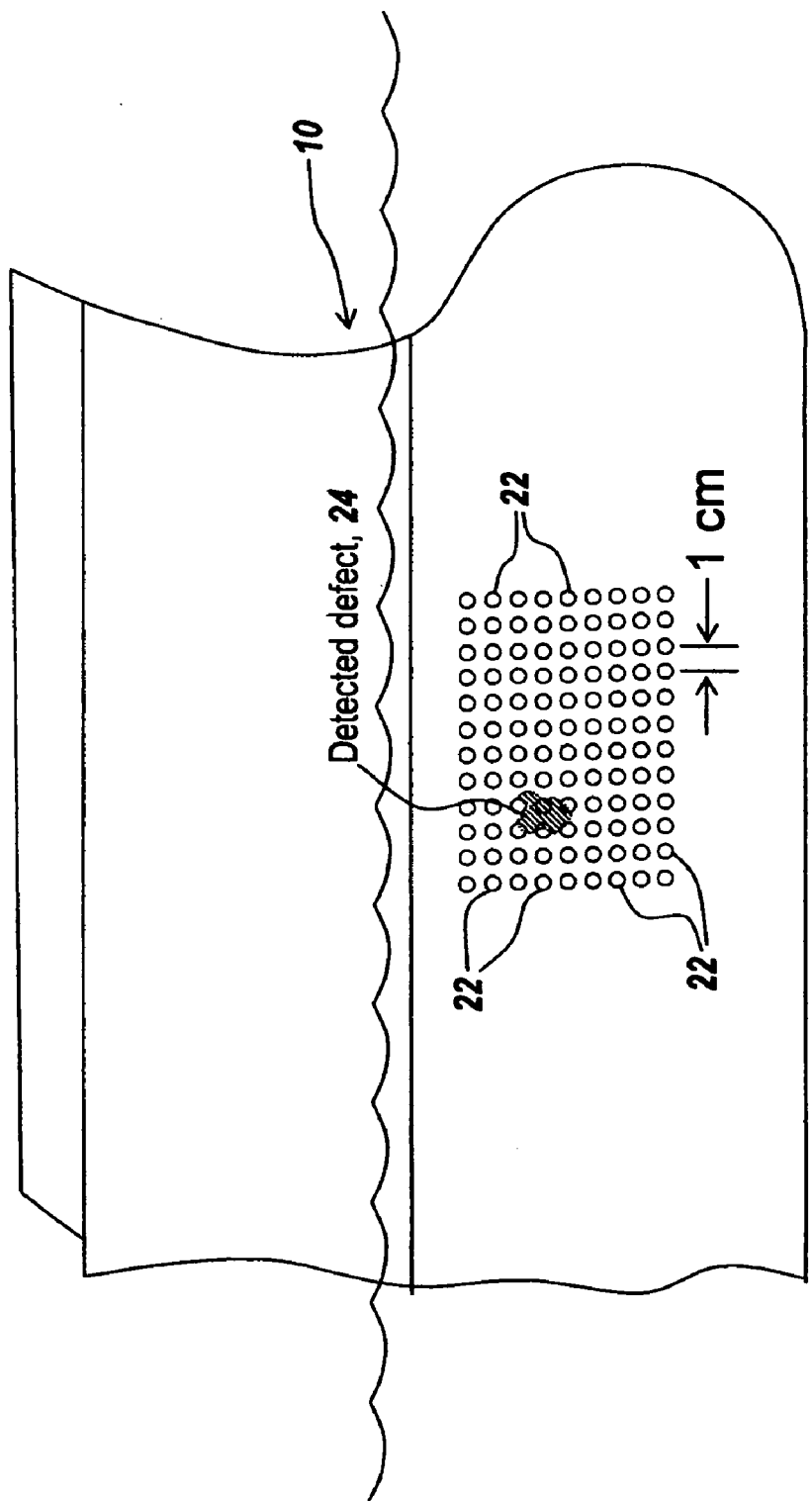
FIG. 2 is a diagrammatic illustration of an in-water survey of the hull of FIG. 1, illustrating the detection of the defect due to the virtually continuous sampling of the hull utilizing the subject system.

Referring now to FIG. 2, were it possible to survey hull 10 at a number of points 22 which, rather than being spaced apart by a foot, are spaced apart by one centimeter, then defect 24 would in fact be detected because of the virtually continuous sampling of the hull.

In the past, and as mentioned hereinbefore, no acoustic system has been devised which can provide an in-water survey to such centimeter accuracies. The result is that hull surveying has been problematical both for ships that have been hauled out and those that have been subject to an in-water survey by divers performing either a visual inspection or primitive measurement of hull integrity.

Figure 3A:
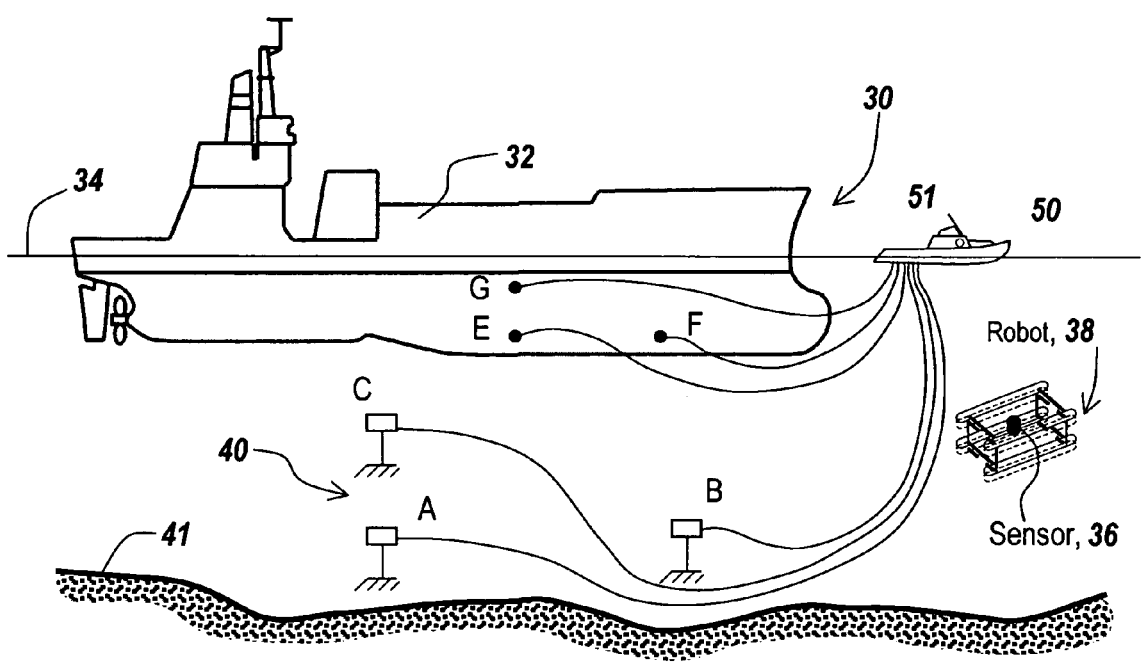
FIG. 3A is a diagrammatic illustration of the subject surveying system in which pingers are placed on the hull of a vessel and transceivers are placed on the seabed, with the survey being done by a sensor carried by an undersea robot.

Referring now to FIG. 3A, a surveying system 30 surveys a ship or vessel 32 floating at the sea surface 34. The surveying system uses a sensor 36 on a robot 38 that maneuvers around the hull of vessel 32 to take measurements of various hull characteristics, such as thickness of the hull and the integrity of various hull components such as welds.

The position of sensor 36 is detected by an array 40 of transceivers A, B and C, which are used to define a fixed reference plane relative to seabed 41.

The position of the hull of vessel 32 is determined by placing pingers E, F and G on the hull, with the pingers defining a hull plane relative to the network of fixed transceivers. The exact position of the hull plane defined by the pingers E, F and G is determined by ranging to transceivers A, B and C.

Control of the timing of pingers E, F and G is established by a master clock in a controller 50, which in one embodiment is carried aboard a ship 51 adjacent vessel 32. The master clock also controls the timing for clocks carried by each of the transceivers A, B and C. As will be described, the start of a pinger pulse is used to reset the transceivers' clocks, which record their count upon receipt of a pinger pulse. In this way, the range of each of the pingers can be established with relation to each of the transceivers. Knowing the position of the hull relative to the network and knowing the position of the sensor relative to the same network, one can establish the position of the sensor relative to the hull even when the hull is moving, as would be the case with currents, wind loading and other factors even if the vessel is anchored.

It will be shown that with such a motion-compensated system, hull integrity measurements can be made in a virtually continuous fashion so that all hull defects can be detected while the ship is at anchor.

Figure 3B:
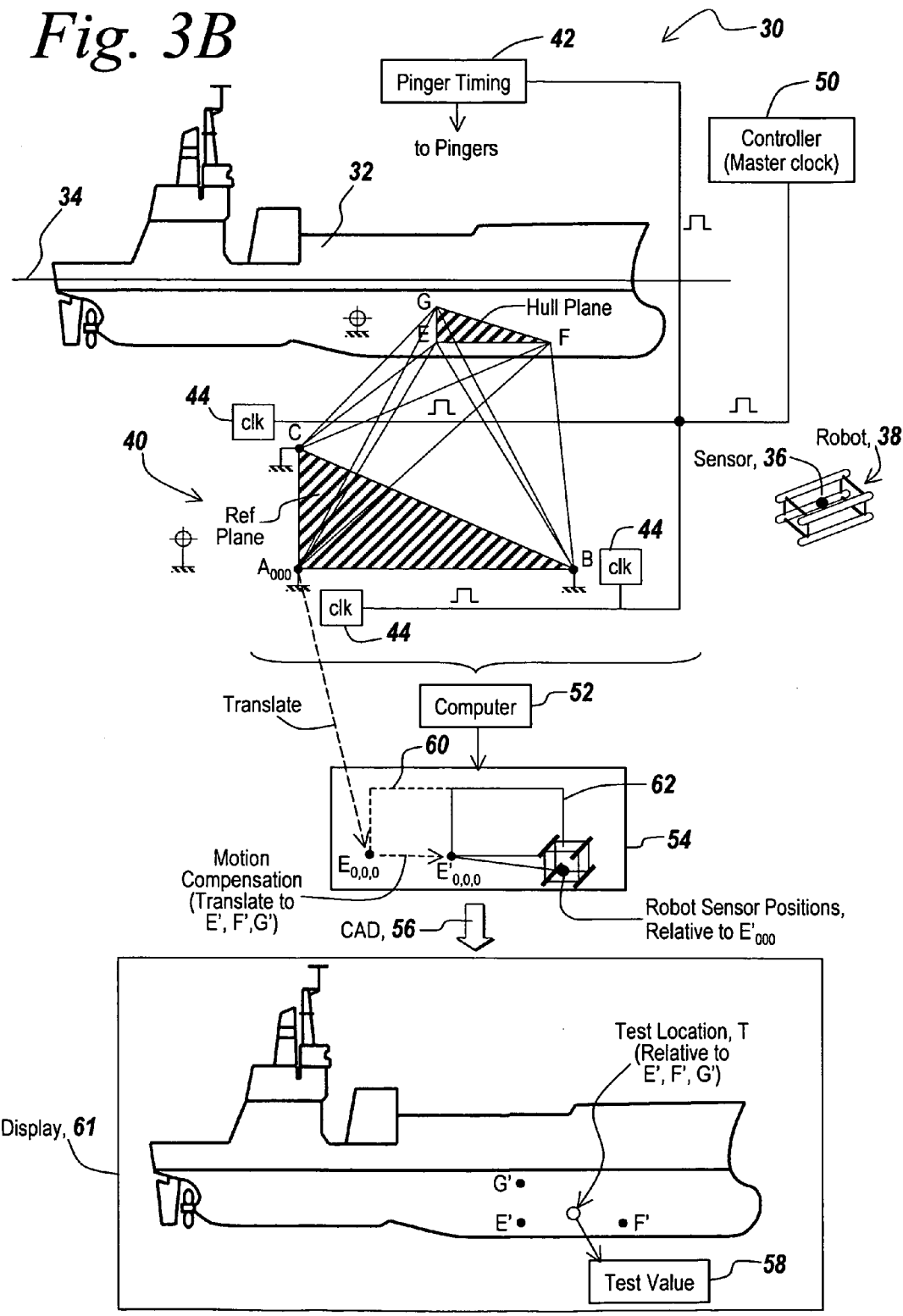
FIG. 3B is a diagrammatic illustration of the surveying system of FIG. 3A, illustrating a virtual horizontal reference plane that is fixed relative to the seabed, also illustrating the establishment of a virtual vertical hull plane, with range measurements from pingers on the hull plane to transceivers on the seabed establishing the virtual horizontal plane from which hull movement is detected, measurements from a sensor spaced from the hull being referenced to the motion-compensated hull plane.

Referring now to FIG. 3B, system 30 involves hull measurements that can be made in a virtually continuous fashion due to the ability to be able to locate hull and sensor positions within one centimeter. Here hull 32 floating on the surface 34 of the ocean has points surveyed by sensor 36 on robot 38, which is made to maneuver around the hull.

The hull position is determined by network 40 of transceivers A, B and C to define a fixed horizontal reference plane 42. Plane 42 is fixed because the transceivers are anchored to the seabed.

As will be described, each of the transceivers has the ability to monitor its own depth relative to the sea surface 34 and has the ability to pick up ultrasonic energy from pingers E, F and G physically located on hull 32 that define a survey plane. For purposes of explanation, this survey plane will be referred to herein as the hull plane.

Assuming for the moment that one could locate transceivers at a single predetermined depth below the surface of the ocean so as to define a fixed horizontal reference plane, and further assuming that a vertical hull plane could be established on the hull, then with a pinger timing unit 43 connected to fire pingers E, F and G on the hull and to control clocks 44 carried by transceivers A, B and C, one can initially measure the position of the hull relative to the reference plane through techniques that measure the time it takes for a pulse generated at a pinger to arrive at a transceiver on the reference plane. Note that controller 50 has a master clock to control pinger firing and to reset transceiver clocks so that range measurements can be made.

The time it takes for a pulse to go from a pinger to a transceiver translates directly into range of the particular pinger to the transceiver such that it is possible to obtain the initial position of the hull plane with respect to the horizontal reference plane.

By tracking the position of sensor 36 on robot 38 relative to the reference plane and knowing the standoff of the robot from the hull, one can obtain a test position labeled P' on the shifted hull plane using computer 52 and detecting the motion of the hull as illustrated at 54. This can be converted as illustrated by arrow 56 into a test location T relative to a shifted hull plane E', F', G'. Thereafter, a test value 58 can be obtained for a test site on the hull.

Now while it is true that an initial plane on the hull can be established in terms of its location relative to a reference plane, as illustrated at 54, an initial plane shown by dotted line 60 is shifted to a position 62 due to motion of the hull. It is therefore incumbent upon the system to recognize this shift and to measure the position of sensor 36 on robot 38 relative to a newly shifted point E' which, through an algorithm to be described, translates the initial origin $A_{0,0,0}$ to the hull plane origin $E_{0,0,0}$ and thence to a shifted hull plane origin $E'_{0,0,0}$.

In this manner, not only is the shift in hull position measured relative to a network on the ocean floor, since the position of the sensor is measured relative to the network on the ocean floor, the position of the sensor, i.e., the test location P', can be placed on the shifted hull plane. As a result, the test location can be either graphically or numerically located relative to the shifted hull plane.

In order to establish the shifted hull plane, one first finds E. Second, one translates $A_{0,0,0}$ to $E_{0,0,0}$.

Third, one finds the shifted hull plane by finding E' through the identical ranging techniques that establish the initial position of pingers E, F and G. Fourth, the system translates the initial $E_{0,0,0}$ to $E'_{0,0,0}$ thus to establish a point that establishes the shifted position of the hull plane.

Having established the shifted position of the hull plane, as a fifth step one locates the position of the robot and thus its sensor relative to the new pinger position $E'_{0,0,0}$.

Figure 4:
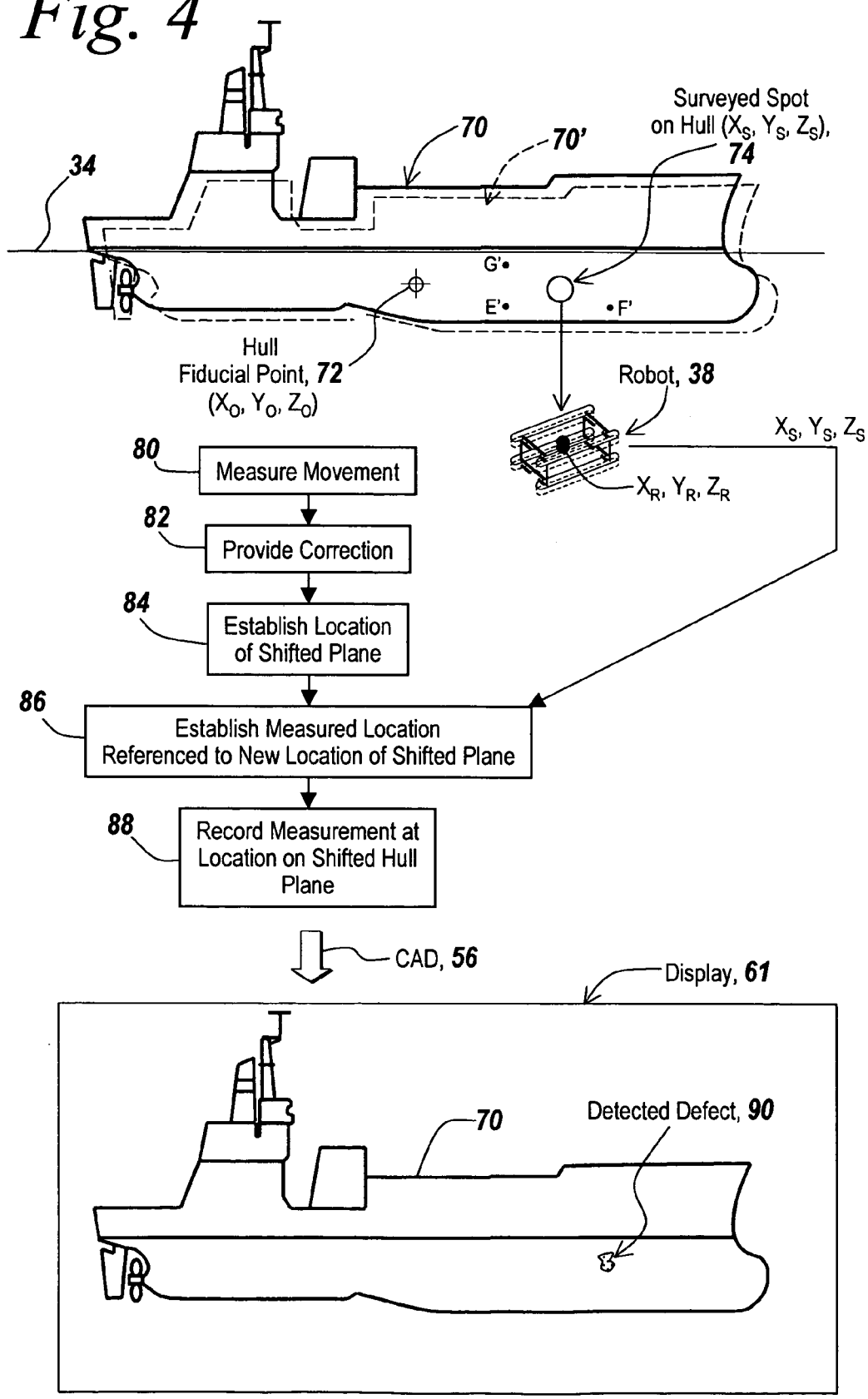
FIG. 4 is a diagrammatic illustration of the system described in FIG. 3, illustrating the method steps to provide the location of a detected defect.

Referring to FIG. 4, what is shown is a hull 70 translated to a hull position of 70' due to the motion of the vessel. This motion results in a shift of hull fiducial point 72. As before, if the hull were not shifted, a plane established by pinger points E, F and G would establish a measuring coordinate system for measuring the position of the surveyed point 74. In one embodiment the survey is made by a sensor on a robot that is maneuvered around the hull, with the sensor having a location $X_S$, $Y_S$ and $Z_S$ relative to the network A, B, C.

In order to provide for an accurate surveying point on the hull, as illustrated at 80, one first measures the movement of the hull. As illustrated at 82, one provides a correction factor and as illustrated at 84, this establishes a new location of the shifted hull plane. As illustrated at 86, one establishes the measured location or surveyed point relative to the new location of the hull plane and, as illustrated at 88, one records the measured location and its value relative to the shifted hull plane so that one can establish, for instance, a defect 90 on hull 70 with a plus or minus one centimeter accuracy.

Figure 5:
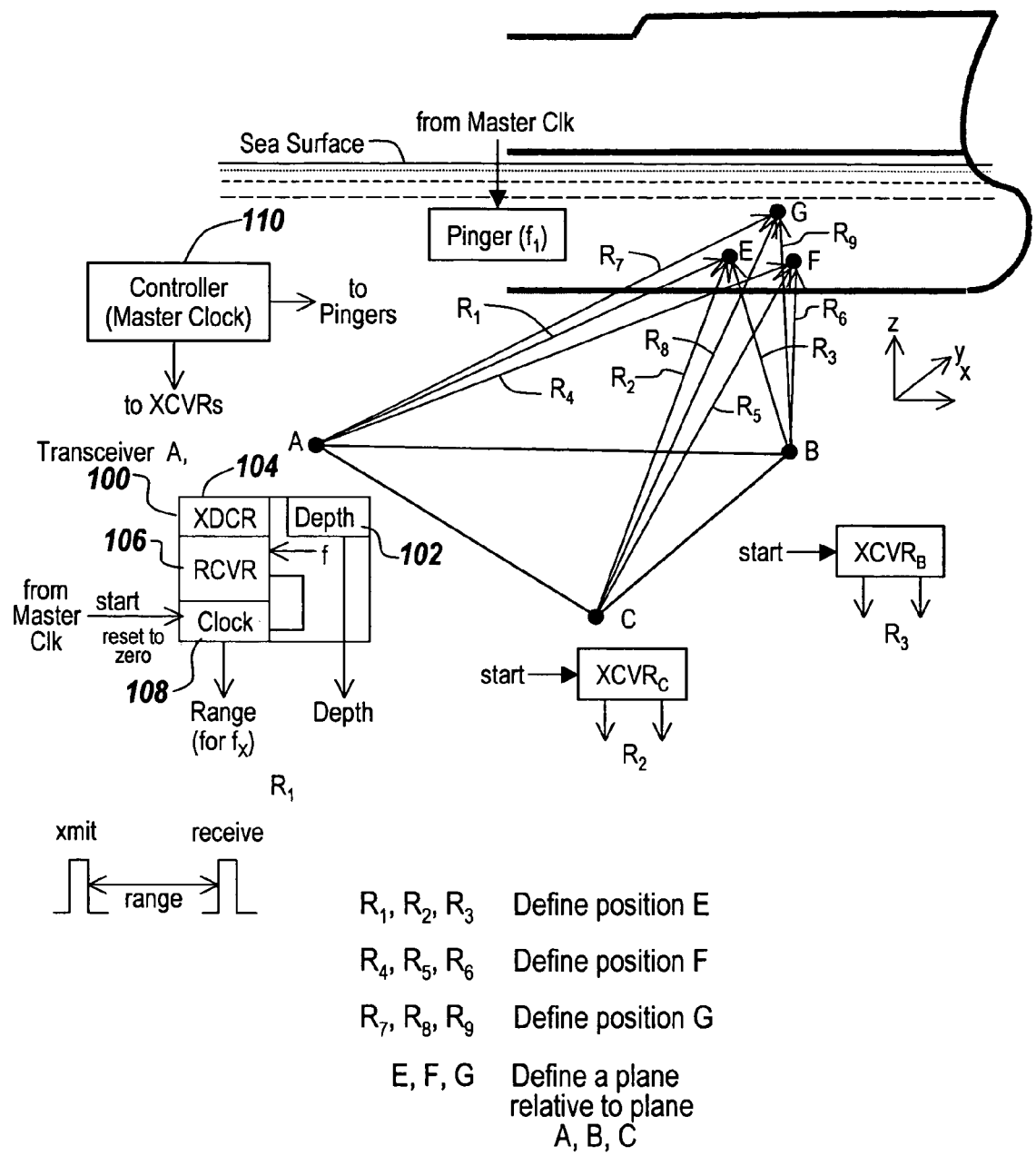
FIG. 5 is a diagrammatic illustration of the development of a fixed virtual horizontal reference plane utilizing transceivers with depth measuring apparatus for detecting acoustic energy from the pingers carried by the hull, thus to establish an initial position for the hull relative to the fixed virtual reference plane.

Referring to FIG. 5, the initial establishment of the hull plane is provided through the determination of the range of pingers E, F and G to transceivers A, B and C; and by providing that each of the transceivers 100 includes a depth sensor 102, a sonic transducer 104, a receiver 106 and a clock 108. A master clock 110 starts clocks 108 upon generating pinger pulses from pingers E, F and G using a pinger tugger unit 112.

Thereafter, the range of pinger E to transceiver A is established, followed by establishing the range of pingers F and G to transceivers A, B and C. Ranges $R_1$, $R_2$, $R_3$ define the position of pinger E, whereas ranges $R_4$, $R_5$ and $R_6$ define the position of pinger F, and ranges $R_7$, $R_8$ and $R_9$ define the position of pinger G. Thus, one can establish a plane E, F and G relative to plane A, B, C.

Now it will be appreciated that it is very difficult, if not impossible, to define a horizontal reference plane on the seabed by adjusting the depths of the particular transceivers above the seabed. Because each of the transceivers has a depth sensor, the depth of each transceiver is known. One can define therefore a virtual fixed horizontal reference plane by shifting, for instance, the depth of transceivers B and C to equal the known depth of transceiver A. This establishes a virtual fixed horizontal reference plane A, B and C regardless of the actual position of the transceivers on the seabed.

Having established a virtual horizontal reference plane, it will be noted that the Z-axis of this horizontal plane is identical to the Z-axis which runs to the center of the earth and which is normal to the surface of the ocean. Because the surface of the ocean is always at right angles to the Z-axis, the Z-axis for the measuring system never changes.

While it may be possible to place pingers on the hull to define a plane that is exactly vertical, this is very difficult. Pingers are placed at points on the hull, which do not necessarily define a vertical plane. In the same manner as previously described, one can change the positions of pingers F and G relative to E so they describe a virtual vertical plane. This virtual vertical plane has the exact same Z-axis as the virtual horizontal reference plane.

Thus, the virtual horizontal reference plane and the virtual vertical hull plane have a common Z-axis that does not vary. This makes the mathematical description of the planes uncomplicated and makes translation to accommodate the motion of the hull plane less computationally complex.

Figure 6:
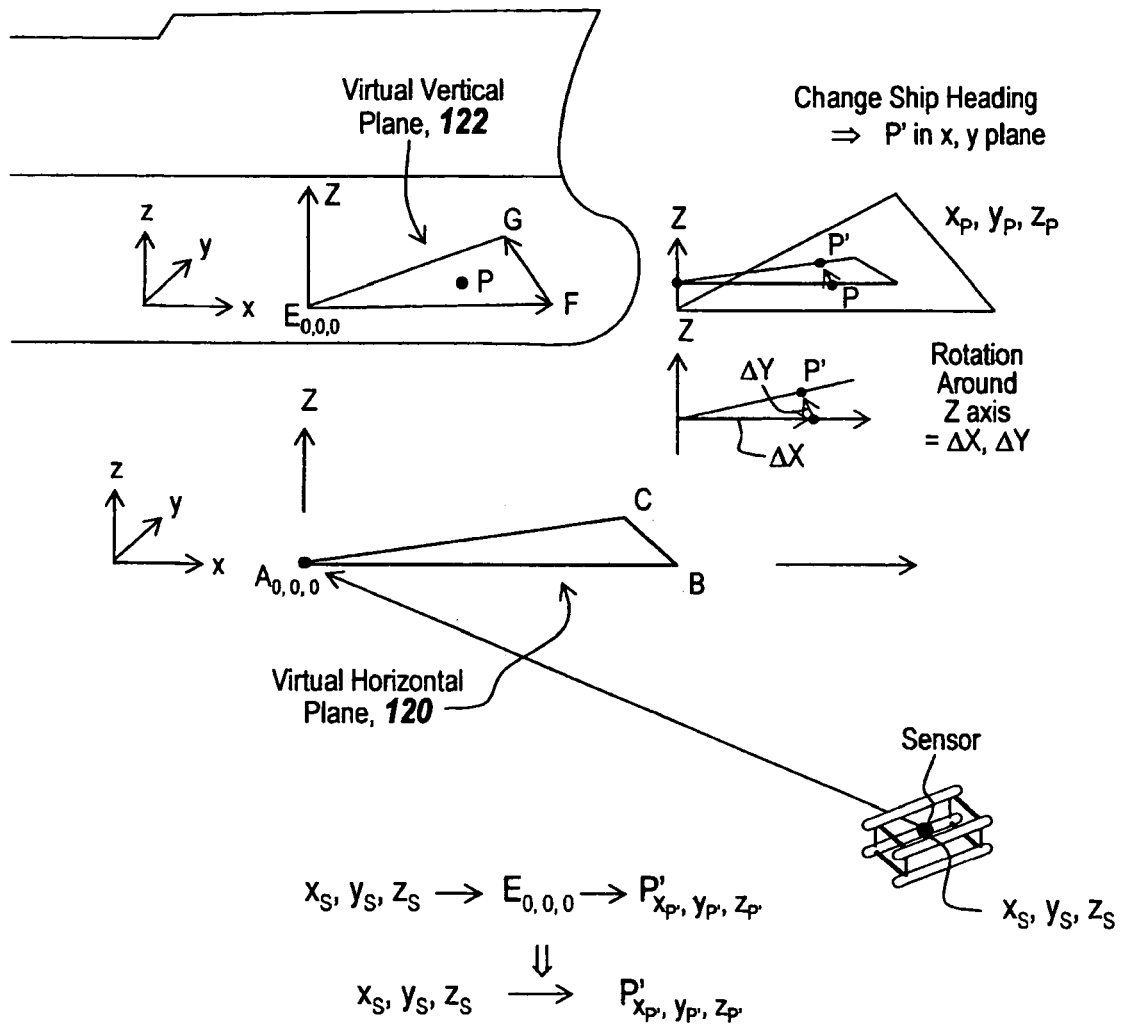
FIG. 6 is a diagrammatic illustration of a change in a point on the hull in terms of a rotation of a virtual vertical hull plane about the Z-axis, with both the virtual horizontal plane and the virtual vertical plane sharing the same Z-axis, such that a point on the ship's hull that changes by virtue of a change of the ship heading is describable in terms of a simple rotation about the Z-axis by scalers $\Delta X$ and $\Delta Y$, thus to simplify the mathematics used to reference sensor location to a shifted hull plane.

The sharing of the Z-axis by both the virtual horizontal and virtual vertical planes is depicted in FIG. 6 in which, if A is located at $A_{0,0,0}$ and B and C define a right triangle, then a virtual horizontal plane can be established with the Z-axis, passing through $A_{0,0,0}$. Then one can translate the E pinger position to $E'_{0,0,0}$, with F and G defining a point relative to E, which is on a virtual vertical plane. Note that the virtual horizontal plane is denoted by reference character 120, whereas the virtual vertical hull plane is denoted by reference character 122.

Here a point P is located within plane E, F, G which is shifted as illustrated by P', for instance by a change in the ship's heading. Thus, the point P in plane E, F, G is shifted to a point P' such that the orthogonal position of P' is $X_{P'}$, $Y_{P'}$ and $Z_{P'}$.

As can be seen, this constitutes a rotation of P' around the Z-axis in which the rotation is described by a $\Delta X$ and $\Delta Y$ from its original P location.

Because the Z-axis is shared by the virtual horizontal and vertical planes, the translation matrix for locating P' moved from an initial point P can be described in terms of a translation along the Z-axis, for instance, with a roll of the ship, and as a lateral shift along the horizontal plane.

The matrix equations for the translations are now presented.

Transformation Matrices

The plane and world (real world) created by the network of transceivers on the ocean floor is fixed.

The plane formed on the vessel hull (hull world) is fixed to the physical hull. The points that make up the hull surface are fixed to the hull world (with the exception of twist and deformation of the hull).

The hull world is referenced from the real world in terms of displacements. Any point in the hull world may be described in terms of the original position of the hull and the current displacement. The origin of the hull world is expressed as x, y and z relative to the real world. As a result, the rotation about that point describes the position of the hull world with respect to the real world. With the exception of minor adjustments for pitch and roll, the Z-axis is a constant. With only translation and one rotation one can theoretically describe the hull world relative to the real world.

Extensions off the hull to points on underwater vehicles can be measured relative to the hull world. Sensors on the underwater vehicle use an independent means to measure the distance of the senor normal to the hull surface. This method compensates for any minor deformation of the hull.

Transformation of a point is a combination of translation and rotation:

Translation is the offset in terms of x, y and z units from the reference point.

$$X1 + X\Delta = X2$$

$$Y1 + Y\Delta = Y2$$

$$Z1 + Z\Delta = Z2$$

Rotation is the rotation about the X, Y and Z-axis.

$$X2 = X1 * \cos(\theta) - Y1 * \sin(\theta)$$

$$Y2 = Y1 * \sin(\theta) + Y1 \cos(\theta)$$

$$Z2 = Z1$$

Transformation of a collection of points or plane is preformed in a matrix. The matrix is an ordered computation of translation and rotation. The ordered process lends itself well to modern computers in computing object position.

The Matrices

Translation $$\begin{bmatrix} 1 & 0 & 0 \\ 0 & 1 & 0 \\ 3 & 2 & 1 \end{bmatrix}$$

Rotation $$\begin{bmatrix} \cos(\theta) & \sin(\theta) & 0 \\ -\sin(\theta) & \cos(\theta) & 0 \\ 0 & 0 & 1 \end{bmatrix}$$

These forms are combined in identity matrices as follows.
3D Translation $$[x, y, z, 1] \begin{bmatrix} 1 & 0 & 0 & 0 \\ 0 & 1 & 0 & 0 \\ 0 & 0 & 1 & 0 \\ x\Delta & y\Delta & z\Delta & 1 \end{bmatrix}$$

3D Rotation (fixed Z)

$$\begin{bmatrix} \cos(0) & \sin(0) & 0 & 0 \\ -\sin(0) & \cos(0) & 0 & 0 \\ 0 & 0 & 1 & 0 \\ 0 & 0 & 0 & 1 \end{bmatrix}$$

The inverse transformations assume the same form.

The compensation for twist or deformation is computed the same way but less frequently. This is possible because the vessel hull acts to dampen this motion allowing simple integration between actual computations to maintain accurate position.

The result of the above translation is that a sensor S having a position $X_S$, $Y_S$ and $Z_S$ is measured relative to the virtual horizontal plane having a transceiver A defining the origin $A_{0,0,0}$. Since E, which is a point on the virtual vertical plane, is $E_{0,0,0}$ shifted to $E'_{0,0,0}$, then original point P is measured relative to $E'_{0,0,0}$.

It is central to the subject invention that the lateral shift in point P yielding a point P' can be described by a simple rotation around the Z-axis in the X and Y directions.

Thus, $X_S$, $Y_S$ and $Z_S$ is related to $E_{0,0,0}$, which is in turn related to $E'_{0,0,0}$, which is in turn related to P', $X_{P'}$, $Y_{P'}$, $Z_{P'}$.

With the establishment of P' in terms of $X_{P'}$, $Y_{P'}$, $Z_{P'}$, then the position of the sensor $X_S$, $Y_S$, $Z_S$, can be directly plotted on P', $X_{P'}$, $Y_{P'}$, and $Z_{P'}$. This locates the sensed survey parameter directly on the shifted hull plane.

Thus, with a simple rotation about Z and noting X and Y positions of the new point, one can establish the sensing point, assuming that one can accurately measure the standoff of the sensor from the hull. This may be accomplished using standard ranging techniques.

Figure 7:
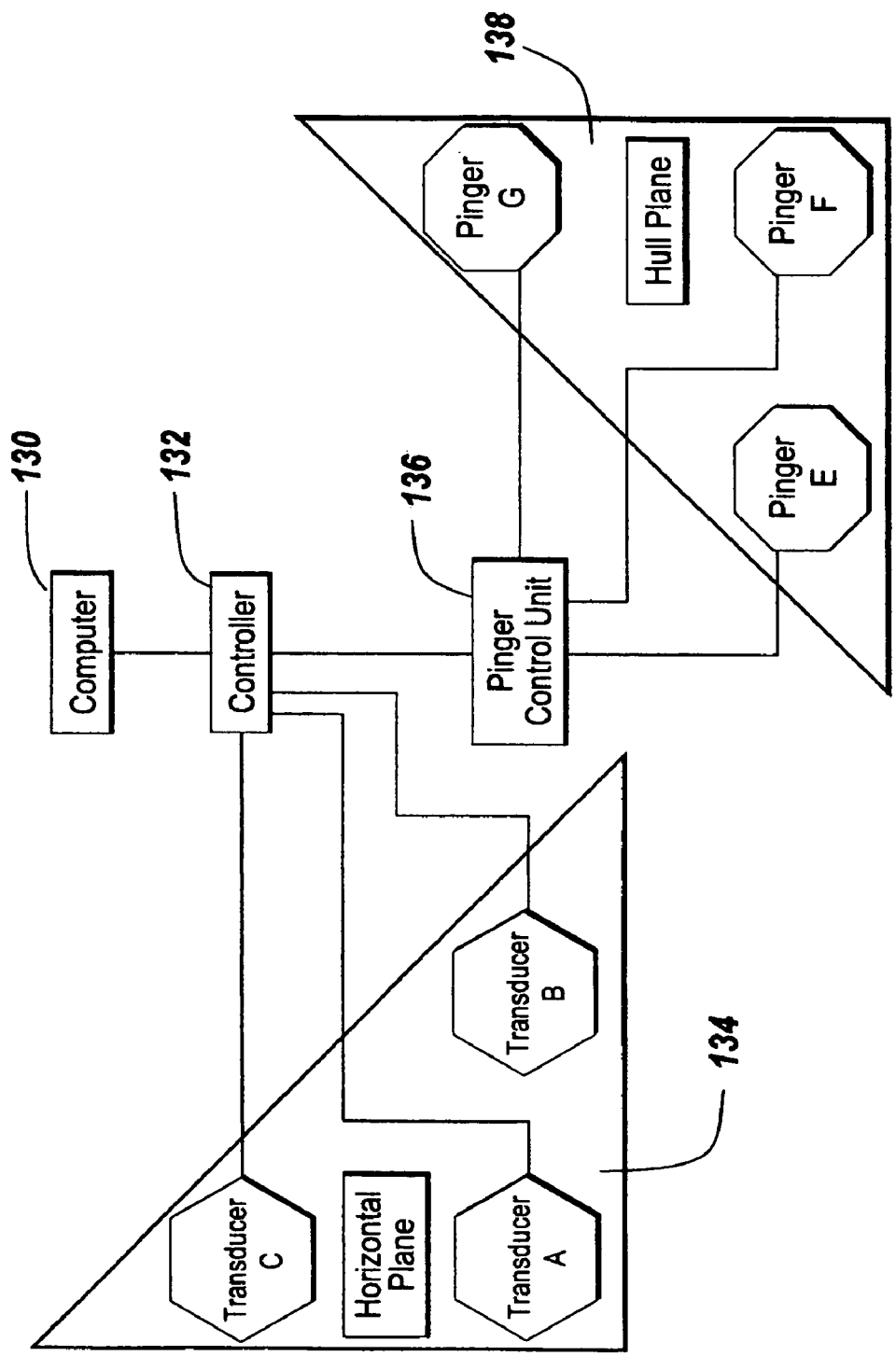
FIG. 7 is a block diagram illustrating transceivers on the seabed controlled by a timing circuit, which also controls the pinging timing for the pingers on the hull, illustrating that the horizontal virtual reference plane of network transceivers A, B, C have their positions translated to a new position of the hull plane in terms of E', F' and G' hull plane pinger locations.

Referring to FIG. 7, more particularly in one embodiment a computer 130 is used to control a controller 132, which is coupled to transceivers A, B and C that define a horizontal plane 134. The purpose of computer 130 is to make sure that controller 132 couples the appropriate timing pulses to transceivers A, B and C to reset the clocks thereof, and also to set the frequency for each of the transceivers to correspond to the frequency of a particular pinger, such that the range to a particular pinger can be ascertained.

Controller 132 also sends frequency and pinger firing instructions to a pinger control unit 136, which controls the pingers E, F and G, which serve to define a hull plane 138.

Figure 8:
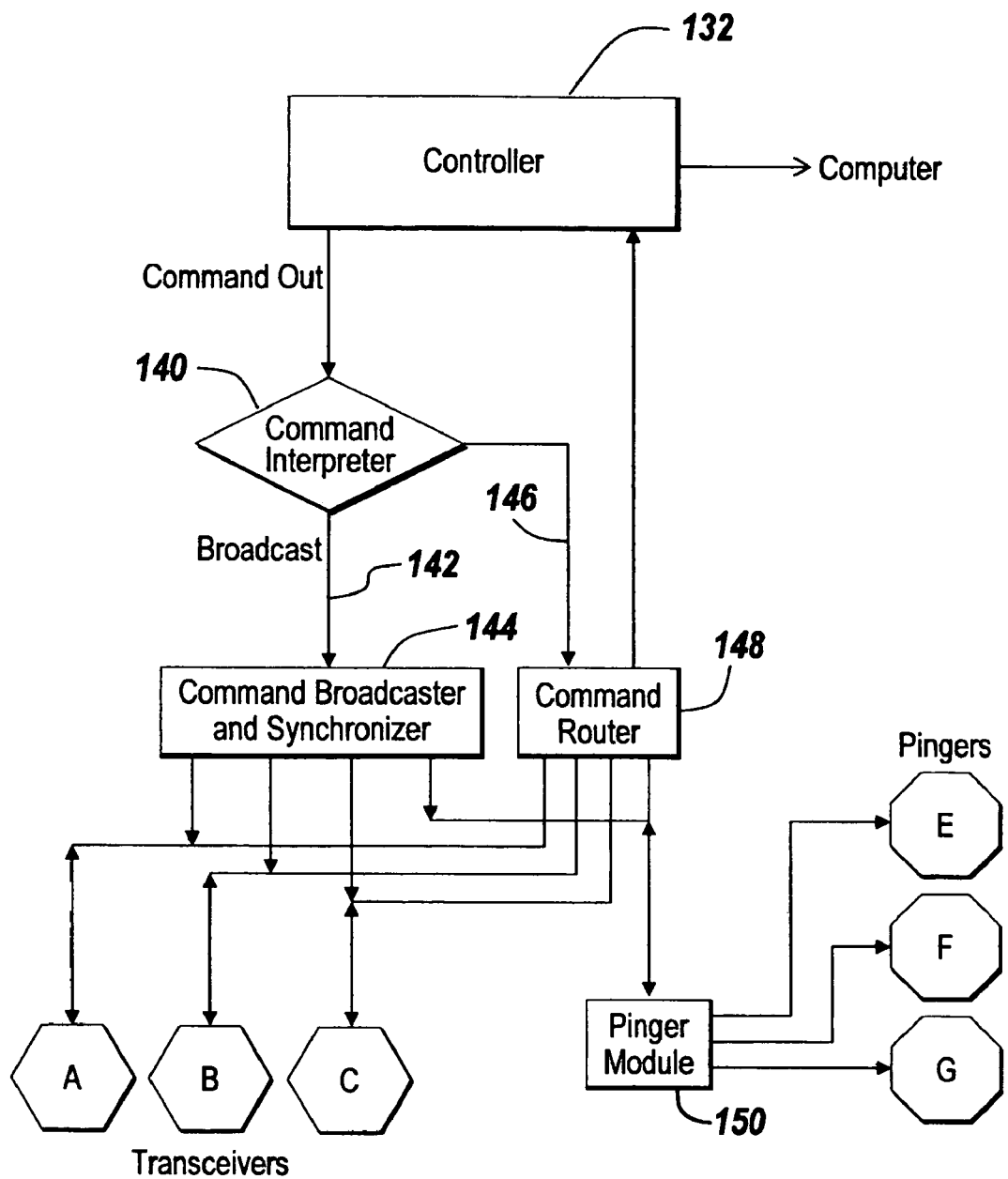
FIG. 8 is a flow chart showing controller operations and data flow in terms of setting the frequency of the pingers to be able to establish which pinger is communicating with a transceiver, as well as controlling pinger firings and the clocks carried by the transceivers, thus to permit establishment of the range of the pingers on the hull from the transceivers on the seabed.

Referring now to FIG. 8, controller 132 generates system synchronization signals and interpretation signals over a command bus to a command interpreter 140. The signals from the command interpreter are coupled as illustrated at 142 to a command broadcaster and synchronizer 144, which couples timing signals to transceivers A, B and C.

The command interpreter also specifies the frequencies of the pingers as illustrated on bus 146 coupled to a command router 148, which is in turn coupled to a pinger module 150 for controlling not only the timing but the frequency of pingers E, F and G.

In terms of the frequency designated for the pingers, command router 148 also routes signals establishing the particular pinger frequencies to the transceivers so that the transceivers can determine, by virtue of the frequency of the incoming signal, which pinger is being heard.

Figure 9:
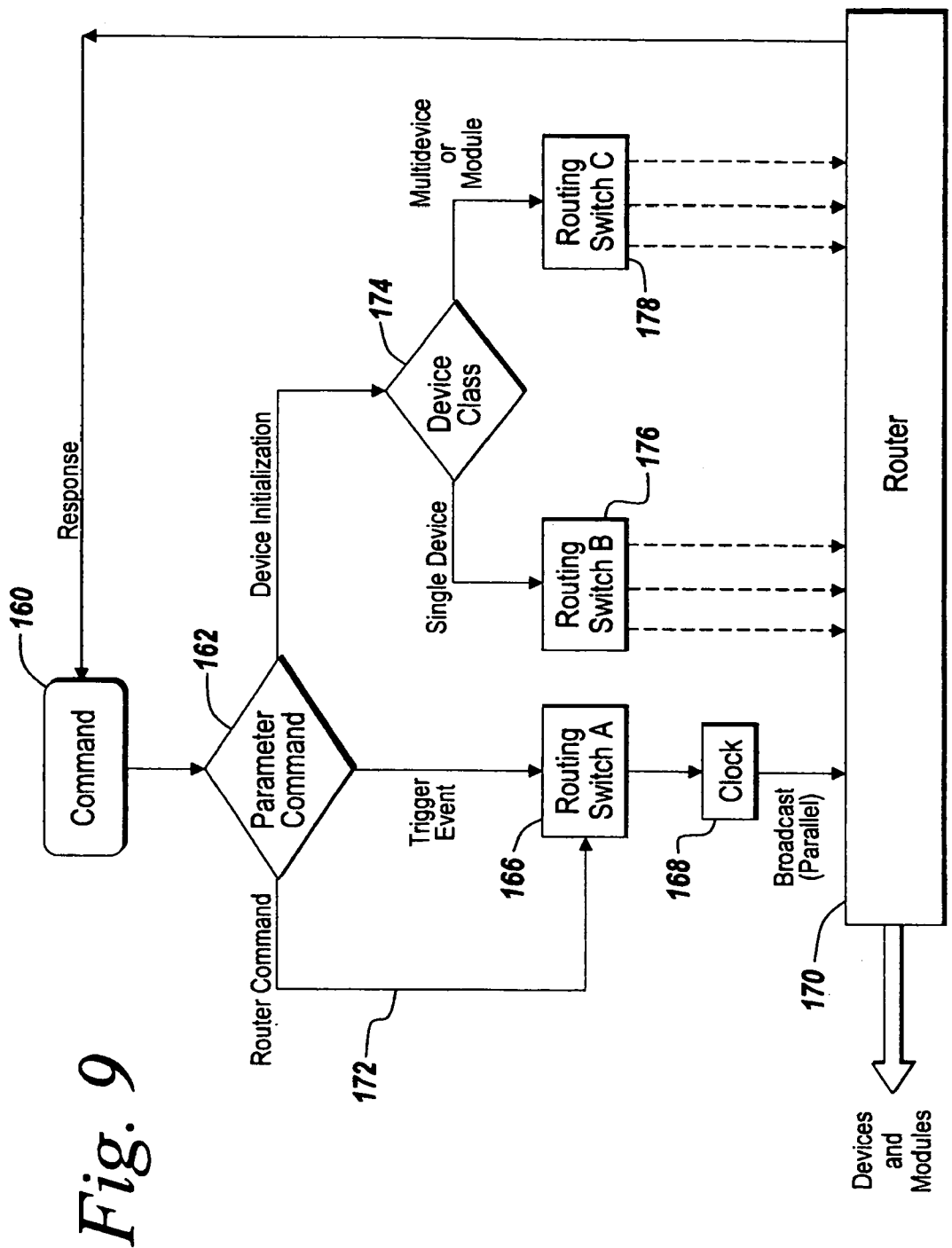
FIG. 9 is a schematic diagram for routing the signals as well as trigger even so as to be able to switch pinger frequencies and control pinger timing through the utilization of a router.

Referring to FIG. 9, from a programming point of view, a command 160 is routed to a parameter command decision block 162, which initiates a trigger event as illustrated at 164 through a routing switch 166 coupled to a clock 168 in transceiver A. Note that the trigger event pulses are broadcast in parallel and are routed as illustrated at 170 to the transceivers.

Not only does the parameter command decision block provide a trigger event pulse, it also provides a router command signal over line 172 to routing switch A 166 to indicate that the clock at transceiver A is to be reset and that transceiver A should expect a pulse from a designated pinger, depending on the frequency of the incoming pulse.

Parameter command 162 is also routed to a device-class decision block 174, which determines whether a single device is being commanded or whether multiple devices or modules are being commanded. The reason for single devices or multiple devices is as follows:

In the process of calibration and operation of multiple devices such as diver tracking modules, diver cursor modules and ROV modules, it is necessary to direct commands to, and responses from, these devices on a periodic basis. The devices can be grouped as a subset for synchronized operation. An example is period calibration where one of the Network transceivers is selected to ping. This is done on a round robin fashion to test the stability of the network positions and determine if update is required. In this way the network, which the heart of the system, watches over itself. If a net transceiver were to move the system alerts the operator of the possible consequences. The ability to compensate for small changes is built into the system as a mini motion compensation sub system. Another example is a diver and ROV in the system at the same time. One may need to update the diver and the ROV in separate time slots to avoid corruption of the ranging.

The single device decision may be routed to a routing switch B as illustrated at 176 or, if multiple devices are indicated, as well to a routing switch 178. The purpose of this command structure is as follows.

Figure 10:
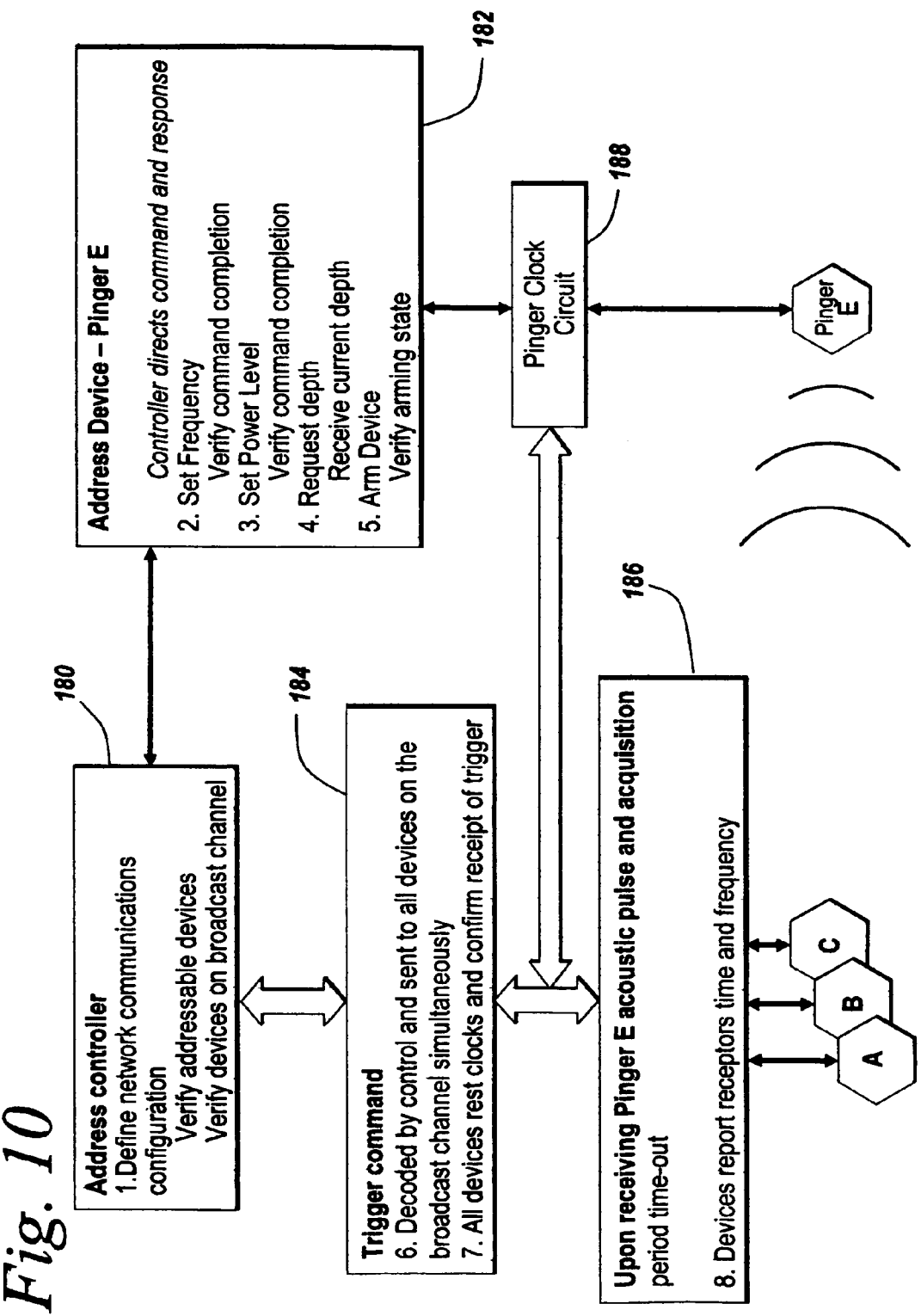
FIG. 10 is a flow chart illustrating the setup of the subject system, including defining the network communications, verifying addressable devices and devices on a broadcast channel, generating trigger commands that are decoded by a control unit and sent to all devices on the broadcast channel simultaneously, with all transceivers having their clocks reset upon a pinger pulse generation, and confirming the receipt of a trigger pulse, with the address controller controlling the addressed device for the pingers to set frequency, power level, request depth readouts, arming the pingers and verifying the arming state, along with controlling the transceivers to report the receipt time and frequency of a pinger pulse from a particular pinger; and, FIG. 11 is a flow chart showing a system for recomputing hull world coordinates by computing pinger position relative to the network, along with appropriate translations to correct the X-axis baseline of the hull plane for movement of the hull normal to the Z-axis, including the transposition of the virtual horizontal plane initial coordinates to the hull plane and the extension of the measurement referenced to the shifted hull plane.

Referring now to FIG. 10, in a typical initialization and trigger sequence scenario, an address controller 180 defines the network communications configuration, verifies addressable devices and verifies devices on the broadcast channel. An address device 182, for instance on pinger E, communicates the frequency at which pinger E is set and verifies the command completion, also verifying the setting of the power level and depth request as well as arming the particular device.

As illustrated at 184, a trigger command is decoded by the controller and is sent to all devices on the broadcast channel simultaneously, with all devices resetting their clocks and confirming receipt of the trigger command. As illustrated at 186, upon receiving an acoustic pulse from a pinger within an acquisition time-out period, the device reports the reception time of the particular pulse and the frequency such that transceivers A, B and C report the range of pinger E to the A, B, C network. Note that pinger E is fired off by a pinger clock circuit 188, which is synchronized with the clocks on the transceivers to be able to make the appropriate range measurement.

Figure 11:
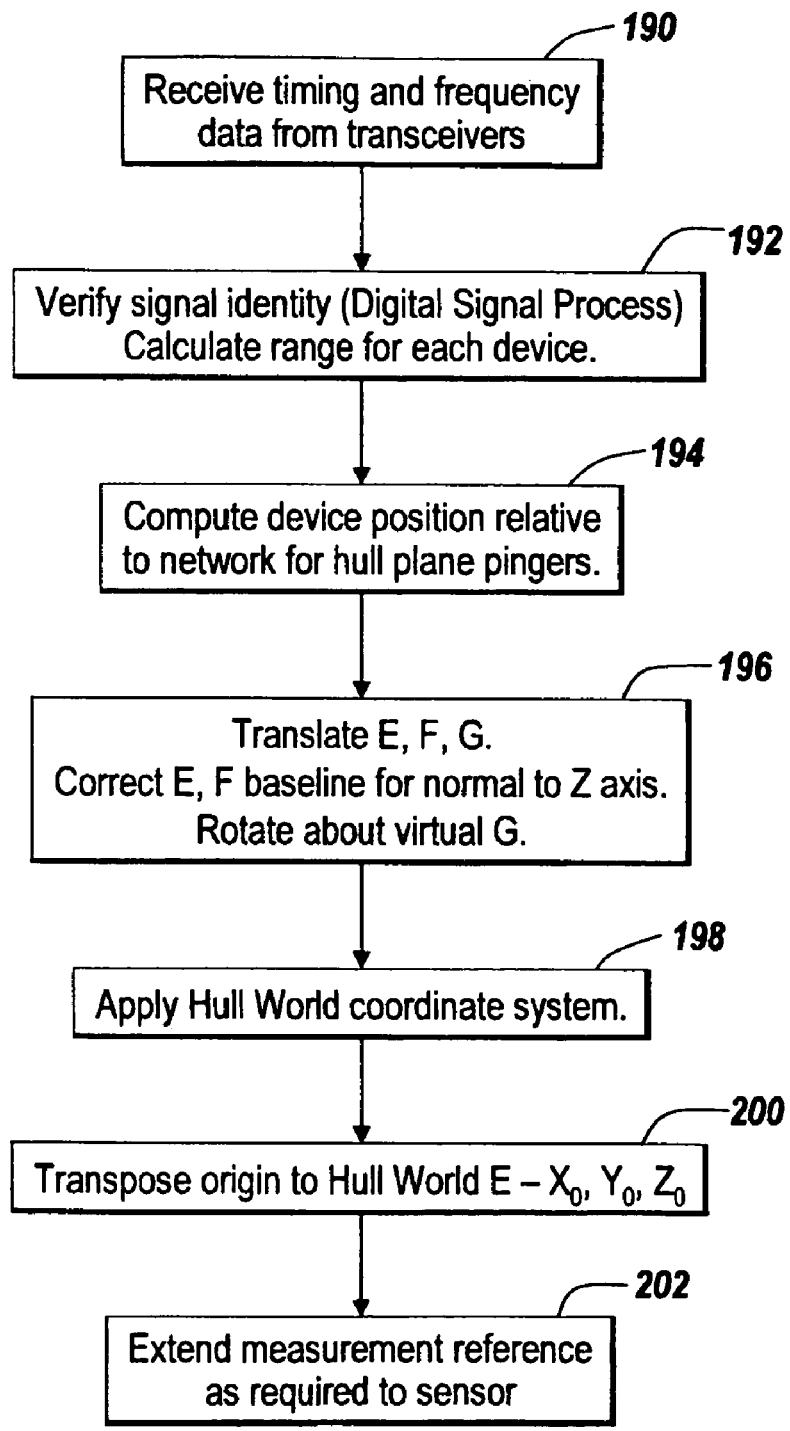

Referring now to FIG. 11, what is shown is the recomputation of the hull plane in terms of first receiving timing and frequency data from the transceivers as illustrated at 190. This is followed by a signal identity verification process at 192 to calculate the range of each pinger to each transceiver. The range is calculated at 194 and a translation matrix 196 is generated to correct the original location of the pingers E, F and G to correct the E, F baseline for normal to the Z-axis and to rotate about a virtual G position.

As illustrated at 198, one applies the hull world coordinate system and, as illustrated at 200, transposes the origin of the hull plane to reflect the sensed shift in the hull plane. As illustrated at 202, the system then extends the measurement reference as required to be able to locate the sensor relative to the sensed shifted hull position.

What will be appreciated is that it is possible within a matter of hours to do an in-water survey much more accurately than can be done conventionally, either by hauling the vessel or by having divers swim around doing visual or other inspections. Thus, what could take up to a week or two to survey now takes as little as two or three hours, in a virtually continuous survey of the hull, with the hull motion compensated for on a real-time basis so that, for instance, a robot or other device flying around the hull can be located precisely with respect to the shifted hull position.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. An ultrasonic surveying method, comprising the steps of:
    placing a network of transceivers in a body of water adjacent an object to be surveyed to establish a reference plane;
    locating an array of pingers on the object to be surveyed to establish a survey plane;
    establishing by ranging from the pingers to the network the location of the survey plane relative to the network;
    detecting relative motion between the network and the pingers during the surveying;
    correcting the location of the survey plane based on the detected motion; and,
    making survey measurements based on the corrected location of the survey plane, the step of making the survey measurements including flying an underwater robot around the object to be surveyed and ultrasonically measuring the position of the robot relative to the network, whereby robotic measurements can be correlated to points on the corrected location of the survey plane.

2. The method of claim 1, wherein the object surveyed includes a fixed underwater structure.

3. The method of claim 1, wherein the reference system for the reference and survey planes includes a common axis.

4. The method of claim 3, wherein the common axis is the Z-axis and wherein the Z-axis is perpendicular to the surface of the body of water.

5. The method of claim 4, wherein the correcting step includes correcting the location of a point on the survey plane by rotating an original point on the survey plane about the Z-axis.

6. The method of claim 4, wherein the correcting step includes correcting the location of a point on the survey plane by translating an original point on the survey plane along an axis orthogonal to the Z-axis.

7. An ultrasonic surveying method, comprising the steps of:
    placing a network of transceivers in a body of water adjacent a ship well to establish a reference plane;
    locating an array of pingers on the ship hull to establish a survey plane;
    establishing by ranging from the pingers to the network the location of the survey plane relative to the network;
    detecting relative motion between the network and the pingers during the surveying;
    correcting the location of the survey plane based on the detected motion; and,
    making survey measurements based on the corrected location of the survey plane.

8. An ultrasonic surveying method, comprising the steps of:
    placing a network of transceivers in a body of water adjacent a dam to establish a reference plane;
    locating an array of pingers on the dam to establish a survey plane;
    establishing by ranging from the pingers to the network the location of the survey plane relative to the network;
    detecting relative motion between the network and the pingers during the surveying;
    correcting the location of the survey plane based on the detected motion; and,
    making survey measurements based on the corrected location of the survey plane.

9. An ultrasonic surveying method, comprising the steps of:
    placing a network of transceivers in a body of water adjacent an object to be surveyed to establish a reference plane including locating the transceivers on the floor of the body of water;
    locating an array of Pingers on the object to be surveyed to establish a survey plane;
    establishing by ranging from the pingers to the network the location of the survey plane relative to the network;
    detecting relative motion between the network and the pingers during the surveying;
    correcting the location of the survey plane based on the detected motion; and,
    making survey measurements based on the corrected location of the survey plane.

10. The method of claim 9, wherein establishing the reference plane includes the step of offsetting the reported location of the transceivers on the floor of the body of water to establish a virtual horizontal reference plane.

11. The method of claim 10, wherein the offsetting step includes the step of ascertaining the depth of each transceiver.

12. A system for surveying an underwater object located in a body of water, comprising:
- a plurality of pingers located on the surface of the underwater object to define a survey plane, each pinger actuated to emit a pinger pulse at a predetermined time;
- a network of transceivers adjacent the underwater object to establish a reference plane, each of said transceivers having an ultrasonic transducer for receiving pinger pulses and a transmitter for transmitting the output of said ultrasonic transducer to a remote location, each of said transceivers having a clock reset at the time a pinger pulse is emitted and stopped when a pinger pulse is received, thus to provide an indication of the range of the transceiver to a pinger to establish the location of the survey plane;
- a surveying device for surveying the underwater object located adjacent the underwater object, the position of the surveying device being determined relative to the reference plane established by said network; and,
- a motion compensation subsystem for detecting the instantaneous position of said survey plane during surveying including a processor for calculating the movement of the survey plane based on the detected ranges of said pingers from said transceivers.

13. The system of claim 12, wherein the location of each of said transceivers is fixed.

14. The system of claim 13, wherein each of said transceivers has a depth sensor for determining the depth of each transducer from the surface of said body of water.

15. The system of claim 14, and further including a processor coupled to each depth sensor for providing a virtual horizontal reference plane by offsetting the actual reference plane established by the location of the transducers on the floor of said body of water, whereby the location of the survey plane can be established from the virtual horizontal reference plane.

16. The system of claim 12, wherein each of said transducers emits pinging pulses at a different ultrasonic frequency, thus to be able to establish the range of a particular pinger to said network.

17. The system of claim 16, wherein the transducers of said transceivers are tunable so as to detect pinger pulses emitted from a selected pinger.

18. A method of rapidly surveying a ship hull in an in-water survey, comprising the steps of:
- placing a network of transceivers adjacent the hull to establish a reference plane;
- locating an array of ultrasonic pingers on the surface of the hull to establish a survey plane;
- establishing by ultrasonic ranging from the pingers to the network the location of the survey plane relative to the network;
- making survey measurements from a surveying instrument relative to the survey plane and,
- during measurement, compensating the survey measurements for a shift in the position of the hull relative to the network of transceivers.

19. The method of claim 18, wherein the survey location measurement accuracy is less than one centimeter between measured points on the hull, thus to provide virtually continuous surveying of the hull, whereby survey gaps are substantially eliminated.

* * * * *